(12) United States Patent
Shackelford, Jr.

(10) Patent No.: US 10,353,277 B1
(45) Date of Patent: Jul. 16, 2019

(54) UNDERWATER CAMERA HOLDER FOR SCUBA DIVING

(71) Applicant: Howard L Shackelford, Jr., Wheeling, WV (US)

(72) Inventor: Howard L Shackelford, Jr., Wheeling, WV (US)

( * ) Notice: Subject to any disclaimer, the term of this patent is extended or adjusted under 35 U.S.C. 154(b) by 0 days.

(21) Appl. No.: 15/921,286

(22) Filed: Mar. 14, 2018

(51) Int. Cl.
  *G03B 17/56* (2006.01)
  *G03B 17/08* (2006.01)
(52) U.S. Cl.
  CPC ............ *G03B 17/563* (2013.01); *G03B 17/08* (2013.01)
(58) Field of Classification Search
  None
  See application file for complete search history.

(56) References Cited

U.S. PATENT DOCUMENTS

| | | | |
|---|---|---|---|
| 3,484,317 A | 12/1969 | Dickerson | |
| 4,113,137 A | 9/1978 | Wind | |
| 4,272,177 A * | 6/1981 | Ottenheimer | F16M 11/08 396/423 |
| 4,281,343 A | 7/1981 | Montiero | |
| 9,612,506 B1 * | 4/2017 | Webb | G03B 17/561 |
| 2007/0248351 A1 * | 10/2007 | Desorbo | G03B 17/563 396/420 |
| 2012/0020656 A1 * | 1/2012 | Farmer | F16M 13/04 396/420 |
| 2014/0340577 A1 * | 11/2014 | Ocampo | H04M 1/04 348/376 |
| 2015/0205187 A1 * | 7/2015 | Preciat Cervera | G03B 17/561 348/211.2 |
| 2015/0264226 A1 * | 9/2015 | Gafni | H04N 5/2252 348/81 |
| 2016/0048070 A1 * | 2/2016 | Overall | G03B 17/561 396/421 |

* cited by examiner

*Primary Examiner* — William B Perkey
(74) *Attorney, Agent, or Firm* — William P. Smith; Spilman Thomas & Battle PLLC

(57) ABSTRACT

A camera mounting bracket is disclosed. The camera mounting bracket is adapted for use underwater by a scuba diver, and includes a first handle portion, a second handle portion, and a junction connector positioned between the first handle portion and the second handle portion. The first handle portion and second handle portion are connected at the junction connector. The junction connector includes a mounting adapter for receiving a mount attached to a camera. The mounting adapter includes a base plate for fastening the adapter to the junction connector, and linkage plates for connection to a camera mount. When the camera is positioned adjacent a user's mask when bracket is gripped by the first and second handle portion. Handle portions are curved or orthogonal. Handle grips may be included, such as knurled end surfaces, rubber or foam wrapping, or non-slip tape attached at the distal ends.

19 Claims, 4 Drawing Sheets

UNDERWATER CAMERA HOLDER FOR SCUBA DIVING

BACKGROUND OF THE INVENTION

The application generally relates to an underwater camera holder for scuba diving. The application relates more specifically to a dual handle bracket with a mounting adapter for attachment of an underwater camera, such as a GoPro or similar video recording device, when scuba diving.

Currently there are underwater video camera housings in which all of the major components thereof are cut to size or shape from conventional, commercially available products such as PVC pipes, transparent synthetic sheet materials and water-tight fittings for exterior control means for operable connection to a video camera, fixed within the housing. The housing includes a pair of diametrically opposed adjustable handles, extending outwardly, from the main housing.

U.S. Patent App. Pub. No. 2015016837 discloses a handheld articulating arm camera mount for mounting an imaging device. The imaging device mount comprises a handle is arranged to be held with one hand by a user; a base connected to the handle; an arm rotatably secured to the base such that the arm can be rotated relative to the handle and secured in place; and a mount head movably secured to the arm, the mount head movable relative to the arm. The mount head is configured to mount an imaging device that is adjustable with multiple degrees of freedom relative to the handle.

Further, a camera housing with integral brackets limits the adaptability and transferability of various cameras to the mounting brackets, e.g., for different light conditions and environmental applications.

In many use cases, a camera mount or bracket may be a single arm that can be held in one hand. Such mounts allow the photographer the use of the free hand, e.g., for focusing a camera lens or holding another device. However, when scuba diving, there are different considerations that challenge the ability of the photographer to control and aim a camera while propelling through water at considerable depth. The current and pressure impose forces that make single-handed camera mounting difficult to frame a subject to be photographed.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

BRIEF SUMMARY OF THE INVENTION

One embodiment relates to a camera mounting bracket. The camera mounting bracket is adapted for use underwater by a scuba diver, and includes a first handle portion, a second handle portion, and a junction connector positioned between the first handle portion and the second handle portion. The first handle portion and second handle portion are connected at the junction connector. The junction connector includes a mounting adapter for receiving a mount attached to a camera.

Another embodiment relates to a mounting adapter on a camera mounting bracket that includes a base plate for fastening the adapter to the junction connector, and linkage plates for connection to a camera mount. When the camera is positioned adjacent a user's mask when bracket is gripped by the first and second handle portion. Handle portions are curved or orthogonal. Handle grips may be included, such as knurled end surfaces, rubber or foam wrapping, or non-slip tape attached at the distal ends.

Certain advantages of the embodiments described herein are dual extending handles for a camera mounting bracket for underwater diving, wherein positive control by the diver is enabled for steady, secure positioning of the camera.

Another advantage is inexpensive, off the shelf components for assembling the camera bracket.

Still another advantage is the ability to attach any desired video or still waterproof camera, e.g., a GoPro® action camera, without having to first insert the camera into a housing.

Another advantage is the ability to easily attach and detach a camera to the bracket connector.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
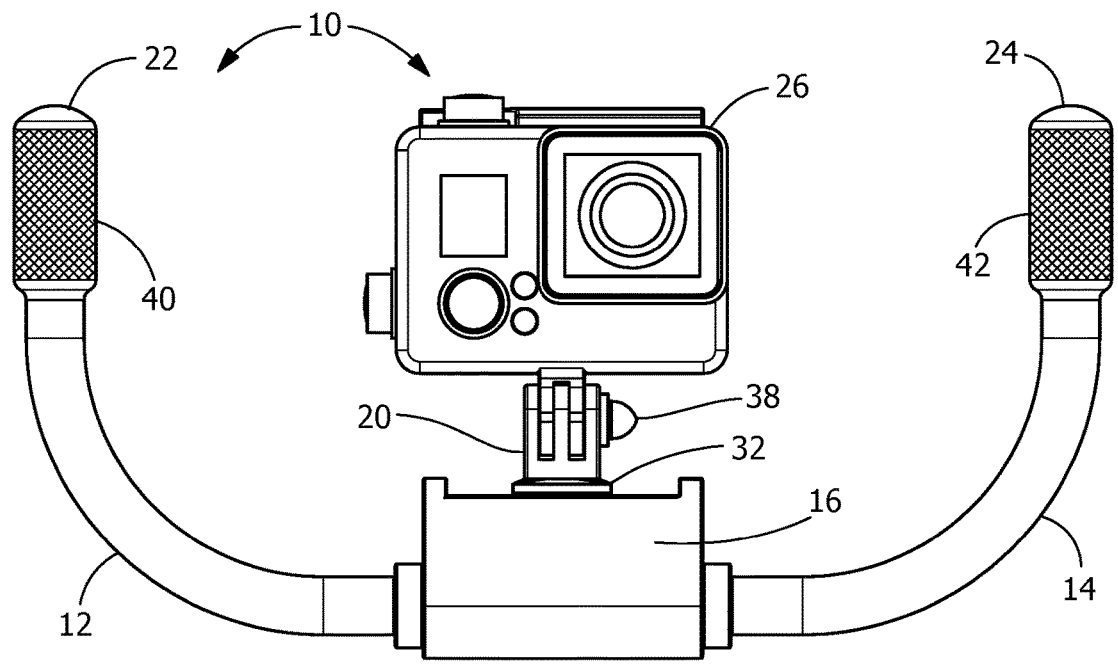
FIG. 1 shows an exemplary perspective view of an underwater camera mounting bracket for scuba diving.
Figure 2:
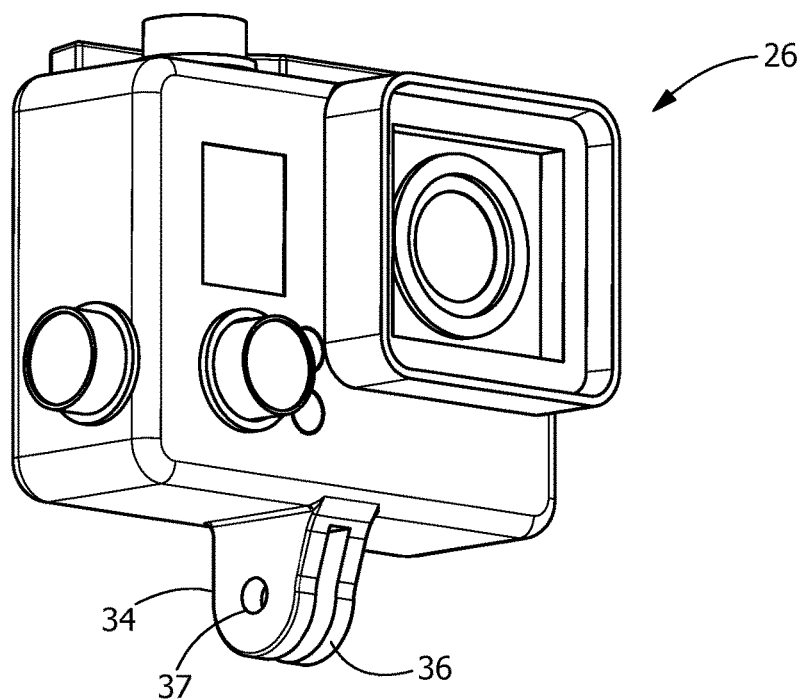
FIG. 2 shows an exemplary camera attachable to the bracket of FIG. 1.

Referring to FIG. 1, a camera mounting bracket 10 of the present invention is shown. A generally U-shaped bracket includes a pair of opposing handle portions 12, 14 connected at a centrally positioned junction connector 16. Junction connector 16 includes attachment means, e.g., a threaded socket, for receiving an end, 22, 24 of handle portion 12, 14, respectively. Junction connector 16 further includes a mounting adapter 20 disposed between handle portions 12, 14. Mounting adapter is suitably configured to receive, e.g., a camera mount (not shown). Junction connector 16 provides a mechanical connection means to connect left- and right-hand handles 12, 14 and the camera. Handles 12, 14 project generally perpendicularly at the left distal end 22 and the right distal end 24, relative to the junction connector 20.

Figure 4:
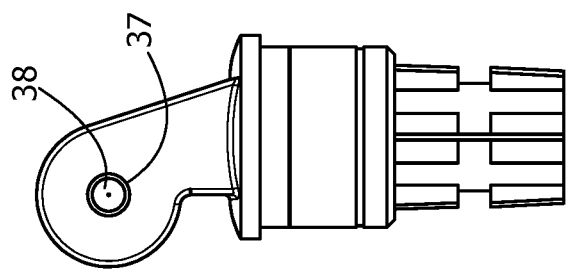
FIG. 4 shows a side view of the attachment means of FIG. 3.
Figure 3:
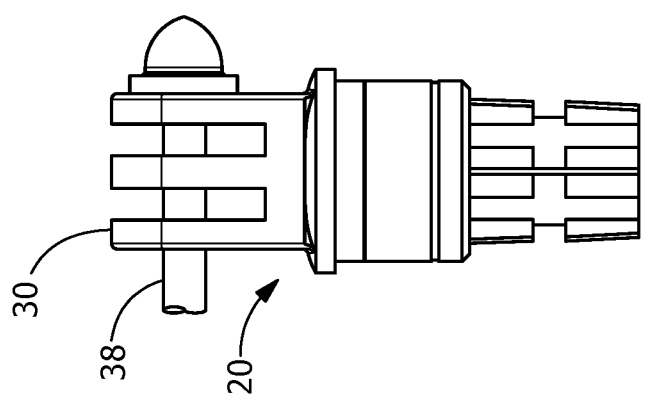
FIG. 3 shows an exemplary attachment means for a camera to the mounting bracket of FIG. 1.
Figure 5:
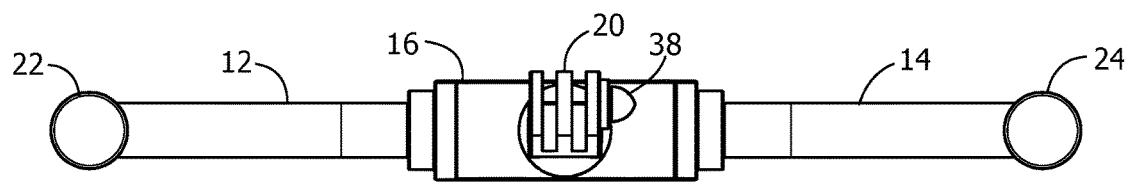
FIG. 5 shows a top view.
Figure 6:
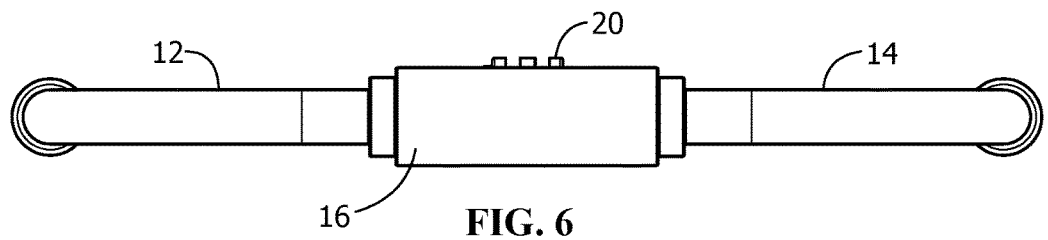
FIG. 6 shows a bottom view.
Figure 8:
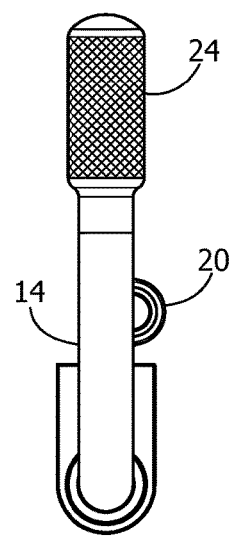
FIG. 8 shows a right/left end view.
Figure 7:
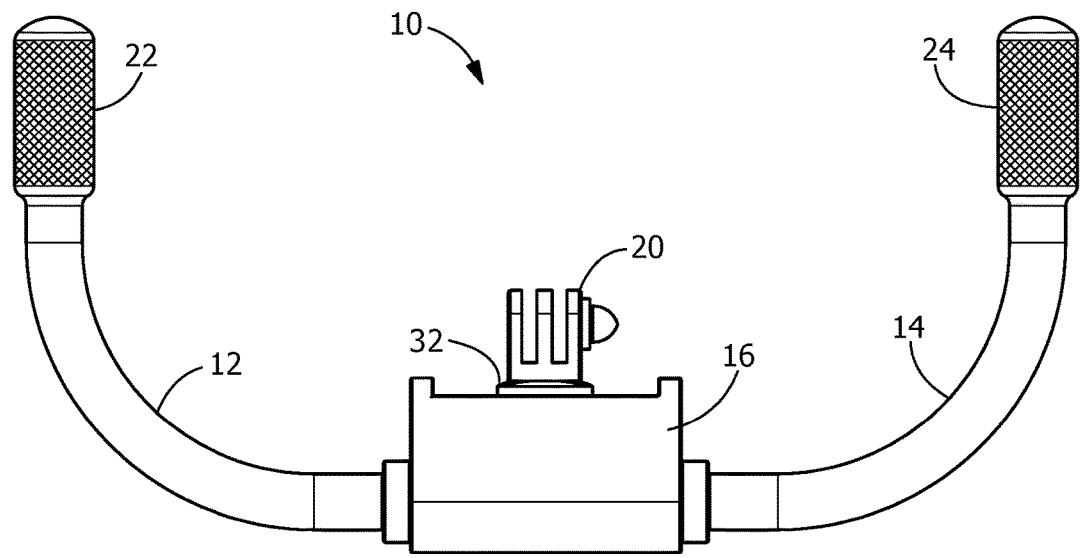
FIG. 7 shows a front/rear view.

When a camera 26 is mounted to adapter 20 (see FIGS. 3 and 4), the camera 26 is positioned adjacent the user's face 28 suitable for framing a video subject through the camera viewfinder. In an embodiment camera 26 may be, e.g., a GoPro® action video camera or similar action or still camera for use in underwater scuba applications. Adapter 20 may be attached by a threaded screw or similar fastener through a base plate 32 to connector 16. Referring to FIGS. 3 and 4, adapter 20 includes a plurality of linkage plates 30 extending from base plate 32 for receiving a mount 34 on camera 26. Mount 34 has corresponding plates 36 that interleave with plates 30 on adapter 20. Plates 30, 36 include a central aperture 37 for inserting a cross-bolt 38 therebetween to interconnect the plates 30, 36, and secure camera 26 to adapter 20.

Handle portions 12, 14 may preferably include frictional grip portions 40, 42 at distal ends 22, 24, respectively, for promoting secure hand grip strength and preventing slippage of handle portions 12, 14 from a user's hands when scuba diving. Grip portions 40, 42 may include knurled surface features, rubber wrapping, foam wrapping, non-slip tape, and similar materials suitable for underwater applications.

Figure 9:
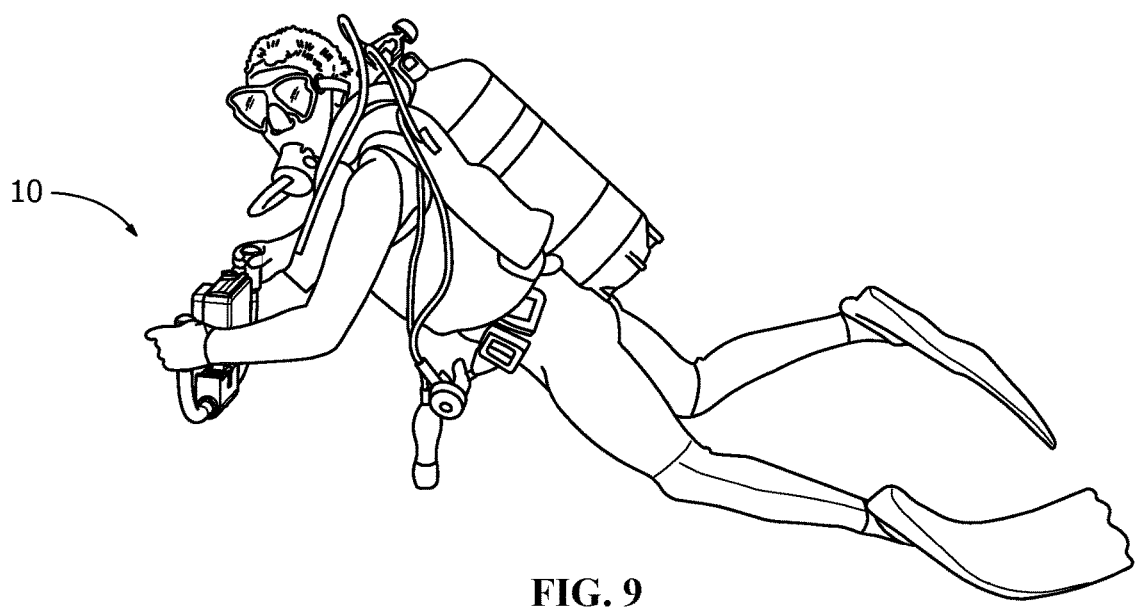
FIG. 9 shows an exemplary use case of a diver holding the underwater mounting bracket while diving.

In one disclosed embodiment junction connector 16 may be a conduit outlet body PVC or galvanized steel for connecting conduit sections, and handle portions 12, 14 constructed of compatible tubing for connection with the conduit outlet body. Handle portions 12, 14 may be curved section of tubing in a 90° arc, or may be orthogonal arm sections joined at a sharp 90° angle, or similar configurations so that a user will be able to focus the viewfinder of camera 26 while holding bracket 10 in front of his or her diving mask. (See, e.g., FIG. 9) Thus the diver will have positive control with both hands for positioning the camera and securing it against hydraulic forces in the water.

FIGS. 5-8 show design views of an embodiment of the camera mounting bracket.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the underwater camera holder for scuba diving as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A camera mounting bracket comprising:
   a bracket having a first handle portion, a second handle portion, and a junction connector positioned between the first handle portion and the second handle portion;
   the first handle portion and second handle portion connected at the junction connector and extending outwardly from the junction connector to a distal end of the respective first handle portion and second handle portion;
   the junction connector comprising a mounting adapter for receiving a mount attached to a camera;
   wherein the junction connector comprises a conduit outlet body for receiving first handle portion and second handle portion opposite the first handle portion to connect first handle portion and second handle portion;
   the first handle portion and the second handle portion comprising conduit sections constructed of compatible tubing for connection with the conduit outlet body;
   wherein the camera is positioned adjacent a user's mask when bracket is gripped by the first and second handle portions.

2. The bracket of claim 1, wherein the junction connector comprising a threaded socket for receiving a first end respectively of left and right handle portions.

3. The bracket of claim 1, wherein the junction connector is arranged to mechanically connect left- and right-hand handles and the camera.

4. The bracket of claim 1, wherein each of the first handle portion and the second handle portion projects generally perpendicularly at the respective distal end, relative to the junction connector.

5. The bracket of claim 4, wherein each of the first handle portion and the second handle portion having a curved shape with a 90° arc.

6. The bracket of claim 4, wherein each of the first handle portion and the second handle portion having a pair of orthogonal arm sections joined to form a 90° angle.

7. The bracket of claim 1, wherein the bracket is generally U-shaped.

8. The bracket of claim 1, wherein the mounting adapter further comprising a base plate, and the mounting adapter connected to the junction connector by a threaded fastener through the base plate.

9. The bracket of claim 8, wherein the mounting adapter comprises a plurality of linkage plates extending from base plate, the linkage plates spaced apart for receiving the mount on the camera.

10. The bracket of claim 9, wherein the camera mount comprises a corresponding plurality of mount plates mateable with the linkage plates.

11. The bracket of claim 10, wherein the linkage plates and the mount plates comprise a central aperture in alignment for inserting a cross-bolt to interconnect the mount plates and the linkage plates to secure the camera to the adapter.

12. The bracket of claim 1, wherein the camera comprises an action video camera for use in underwater scuba application.

13. The bracket of claim 1, wherein the camera comprises a still camera for use in underwater scuba applications.

14. The bracket of claim 1, wherein the left handle portion and the right handle portion comprise frictional grip portions at a distal end respectively, for promoting secure hand grip strength and preventing slippage of handle portions from a user's hands when scuba diving.

15. The bracket of claim 14, wherein the grip portions comprise knurled surface features.

16. The bracket of claim 14, wherein the grip portion is comprised of at least one of a rubber wrapping, a foam wrapping, or a non-slip tape, suitable for underwater applications.

17. The bracket of claim 1, wherein the conduit sections and the conduit outlet body is comprised of PVC or galvanized steel tubing.

18. The bracket of claim 11, wherein the bracket comprises the mounting adapter adjustable about the cross-bolt to an angle relative to the handle portions so that the user focuses the viewfinder of camera while holding the bracket in front of a diving mask worn by the user.

19. The bracket of claim 18, wherein the bracket provides positive control for the user with both hands for positioning and securing the camera against hydraulic forces in the water.

\* \* \* \* \*